United States Patent
Lee et al.

(10) Patent No.: US 10,616,927 B2
(45) Date of Patent: Apr. 7, 2020

(54) METHOD BY WHICH TERMINAL TRANSMITS V2X SIGNAL IN WIRELESS COMMUNICATION SYSTEM, AND TERMINAL USING METHOD

(71) Applicant: LG Electronics Inc., Seoul (KR)

(72) Inventors: Seungmin Lee, Seoul (KR); Hanbyul Seo, Seoul (KR); Myoungseob Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/776,617

(22) PCT Filed: Nov. 17, 2016

(86) PCT No.: PCT/KR2016/013291
§ 371 (c)(1),
(2) Date: May 16, 2018

(87) PCT Pub. No.: WO2017/086720
PCT Pub. Date: May 26, 2017

(65) Prior Publication Data
US 2018/0359787 A1    Dec. 13, 2018

Related U.S. Application Data

(60) Provisional application No. 62/256,653, filed on Nov. 17, 2015, provisional application No. 62/257,180, filed on Nov. 18, 2015.

(51) Int. Cl.
*H04W 74/08*    (2009.01)
*H04W 72/02*    (2009.01)
(Continued)

(52) U.S. Cl.
CPC ....... *H04W 74/0858* (2013.01); *H04L 1/1848* (2013.01); *H04W 4/40* (2018.02);
(Continued)

(58) Field of Classification Search
CPC ... H04W 74/0858; H04W 4/40; H04W 28/26; H04W 72/02; H04W 72/0446;
(Continued)

(56) References Cited

U.S. PATENT DOCUMENTS

| | | | |
|---|---|---|---|
| 2015/0271786 A1 | 9/2015 | Xue et al. | |
| 2017/0265198 A1* | 9/2017 | Sorrentino | H04W 72/12 |
| 2018/0227882 A1* | 8/2018 | Freda | H04W 8/005 |

FOREIGN PATENT DOCUMENTS

WO    2015/069040 A1    5/2015

OTHER PUBLICATIONS

Huawei et al., "Collision Avoidance for Mode 2", R1-156932, 3GPP TSG RAN WG1 Meeting #83, Anaheim, USA Nov. 7, 2015.
(Continued)

*Primary Examiner* — Jae Y Lee
(74) *Attorney, Agent, or Firm* — Dentons US LLP

(57) ABSTRACT

Provided are a method by which a terminal transmits a vehicle-to-everything (V2X) signal in a wireless communication system, and a terminal using the method. The method comprises: reserving a plurality of V2X transmission resources on the basis of one scheduling assignment; reselecting a V2X transmission resource if a resource collision occurs for a certain time or more among the plurality of reserved V2X transmission resources; and transmitting a V2X signal by using the reselected V2X transmission resource.

9 Claims, 14 Drawing Sheets

(51) Int. Cl.
  *H04W 4/40* (2018.01)
  *H04L 1/18* (2006.01)
  *H04W 28/26* (2009.01)
  *H04W 72/04* (2009.01)
  *H04W 74/02* (2009.01)

(52) U.S. Cl.
  CPC ........... *H04W 28/26* (2013.01); *H04W 72/02* (2013.01); *H04W 72/0446* (2013.01); *H04W 74/0825* (2013.01); *H04L 1/1887* (2013.01); *H04W 74/02* (2013.01)

(58) Field of Classification Search
  CPC ............. H04W 74/0825; H04W 74/02; H04L 1/1848; H04L 1/1887
  See application file for complete search history.

(56) References Cited

OTHER PUBLICATIONS

CATT, "Further Discussion on Resource Allocation Mechanism in PC5-based V2V", R1-156605, 3GPP TSG RAN WG1 Meeting #83, Anaheim, USA, Nov. 7, 2015.
NTT DOCOMO, "Discussion on Resource Allocation Enhancement for PC5 based V2V Communications", R1-157313, 3GPP TSG RAN WG1 Meeting #83, Anaheim, USA, Nov. 7, 2015.

* cited by examiner

METHOD BY WHICH TERMINAL TRANSMITS V2X SIGNAL IN WIRELESS COMMUNICATION SYSTEM, AND TERMINAL USING METHOD

CROSS-REFERENCE TO RELATED APPLICATIONS

This application is the National Stage filing under 35 U.S.C. 371 of International Application No. PCT/KR2016/013291, filed on Nov. 17, 2016, which claims the benefit of U.S. Provisional Applications No. 62/256,653 filed on Nov. 17, 2015, and No. 62/257,180 filed on Nov. 18, 2015, the contents of which are all hereby incorporated by reference herein in their entirety.

BACKGROUND OF THE INVENTION

Field of the Invention

The present invention relates to wireless communication, and more particularly, to a method of transmitting a vehicle-to-everything (V2X) signal of a terminal in a wireless communication system, and the terminal using the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, 3rd Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

Meanwhile, there is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

Meanwhile, the D2D operation may also apply to vehicle-to-everything (V2X). The V2X collectively refers to communication techniques using a vehicle and all interfaces. A type of the V2X may be various such as vehicle-to-vehicle (V2V), vehicle-to-infrastructure (V2I), vehicle-to-person (V2P), vehicle-to-network (V2N), or the like.

Meanwhile, a resource collision may occur between different terminals in V2X communication. That is, a collision may occur in which the different terminals transmit a V2X signal by using the same time/frequency resource. When the resource collision occurs several times, which method will be used by the terminal to transmit collision-related information may be a problem. For example, there is a need to define how to handle a situation in which an amount of collision-related information to be reported is greater than a capacity of resources/channels assigned to the terminal for the purpose of transmitting the collision-related information.

In addition, a method of reserving multiple V2X transmission resources by using one (or a relatively smaller number in comparison with the multiple V2X transmission resources) may be used in the reserving of the V2X transmission resource for transmitting a V2X signal. When this method is used by multiple terminals to reserve the V2X transmission resources, a collision of the V2X transmission resource may occur repeatedly. There is a need to define how to handle a situation in which the resource collision occurs.

SUMMARY OF THE INVENTION

The present invention provides a method of transmitting a vehicle-to-everything (V2X) signal of a terminal in a wireless communication system, and a terminal using the method.

In one aspect, provided is a method for transmitting a vehicle-to-everything (V2X) signal of a terminal in a wireless communication system. The method includes reserving multiple V2X transmission resources on the basis of a single scheduling assignment, reselecting a V2X transmission resource when a resource collision occurs for at least a specific time among the multiple reserved V2X transmission resources and transmitting a V2X signal by using the reselected V2X transmission resource.

Whether the resource collision occurs may be determined based on whether V2X transmission resources indicated by a scheduling assignment received from a different terminal overlap with the reserved multiple V2X transmission resources.

Whether the resource collision occurs may be determined based on whether energy greater than or equal to a specific value is detected from the reserved multiple V2X transmission resources.

The multiple V2X transmission resources may be reserved in multiple subframes.

A V2X transmission resource may be reselected in subframes which come after the specific time among the multiple subframes.

A scheduling assignment for reserving next V2X transmission resources may be transmitted in at least one subframe among the multiple subframes.

The method may further include attempting to detect a scheduling assignment transmitted by a different terminal and transmitting the single scheduling assignment when the detection attempt fails at least a specific number of times.

Upon detecting multiple resource collisions from the reserved multiple V2X transmission resources, only information regarding some resource collisions determined based on a priority may be reported to a different terminal or a base station.

The priority may be determined based on at least one of a reception power level of a resource in which a resource collision occurs, the number of times of resource collision occurrences, a duration of the resource collision, a type of a channel or signal transmitted in the resource in which the resource collision occurs, and an assignment period of the resource in which the resource collision occurs.

In another aspect, provided is a terminal capable of transmitting a vehicle-to-everything (V2X) signal. The terminal includes a radio frequency (RF) unit transmitting and receiving a radio signal and a processor operatively coupled to the RF unit. The processor is configured to reserve multiple V2X transmission resources on the basis of a single scheduling assignment, reselect a V2X transmission resource when a resource collision occurs for at least a specific time among the multiple reserved V2X transmission resources and transmit a V2X signal by using the reselected V2X transmission resource.

When multiple resource collisions occur in regards to V2X signal transmission and thus an amount of resource collision information is greater than a capacity of resources/channels assigned for the purpose of transmitting information regarding the resource collision, only a part of resource collision information is transmitted based on a priority. Since a higher priority can be assigned to resource collision information which is highly important, efficiency is improved. When the resource collision is continued or repeated by at least a specific level, a V2X transmission resource is reselected to avoid a collision or to reduce a collision occurrence probability, thereby improving efficiency of V2X signal transmission.

DESCRIPTION OF EXEMPLARY EMBODIMENTS

Figure 1:
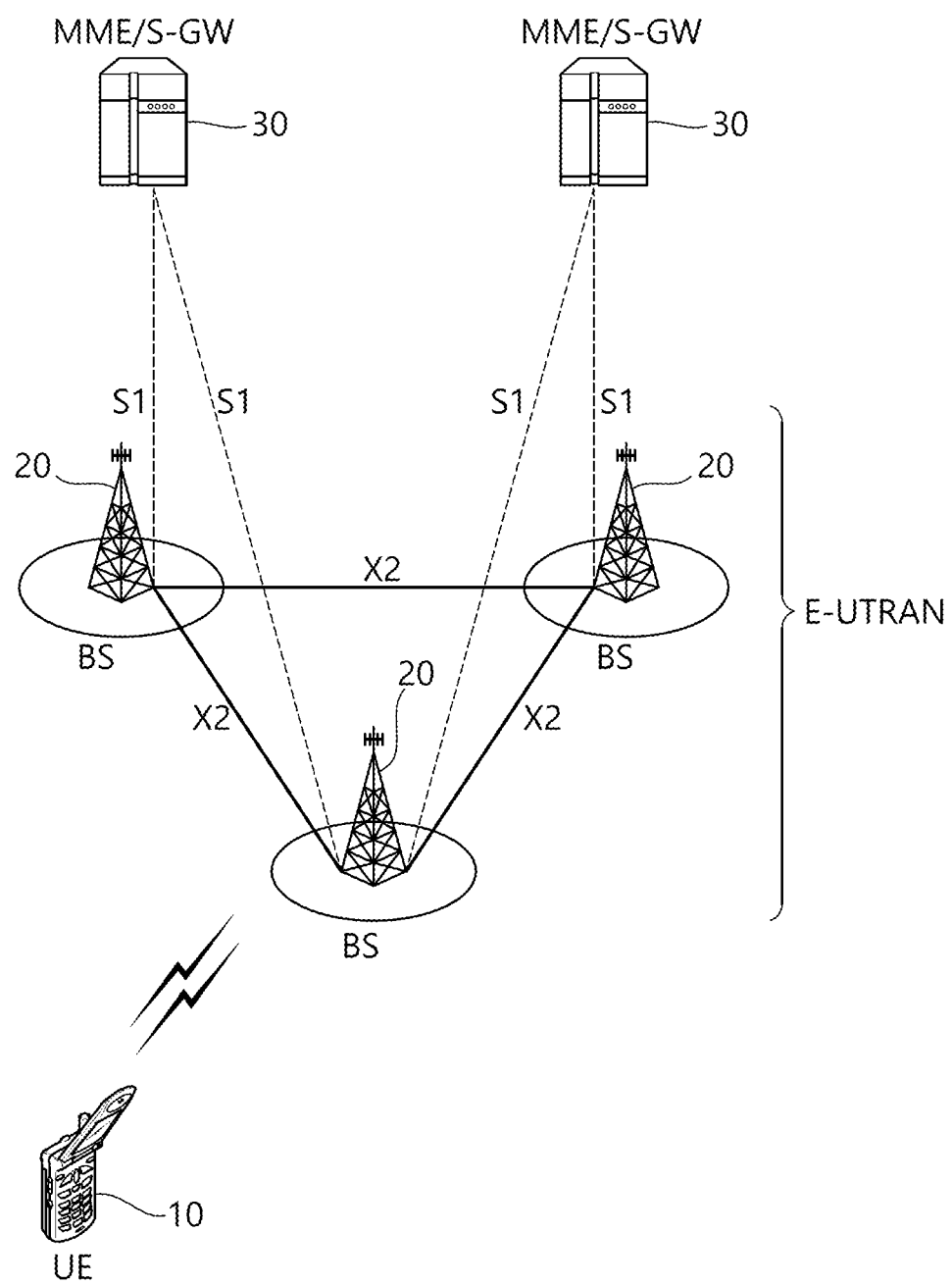
FIG. 1 shows a wireless communication system.

FIG. 1 shows a wireless communication system.

The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
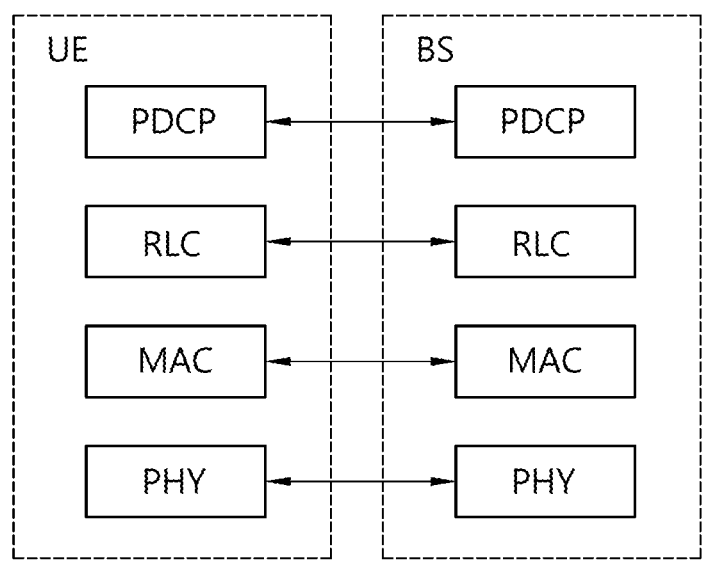
FIG. 2 is a diagram showing a wireless protocol architecture for a user plane.
Figure 3:
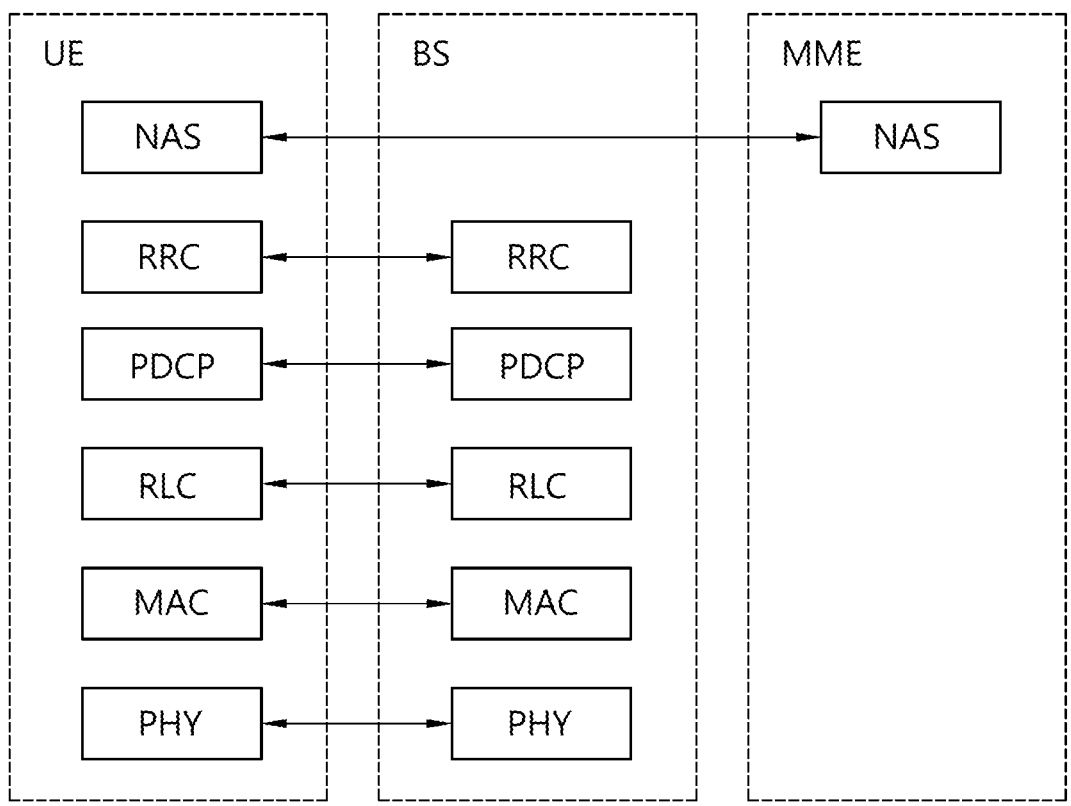
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

The D2D operation will now be described. In 3GPP LTE-A, the service related to D2D operation is called proximity based service (ProSe). Hereinafter, ProSe is equivalent to D2D operation and ProSe may be interchanged with D2D operation. ProSe will now be described.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 4:
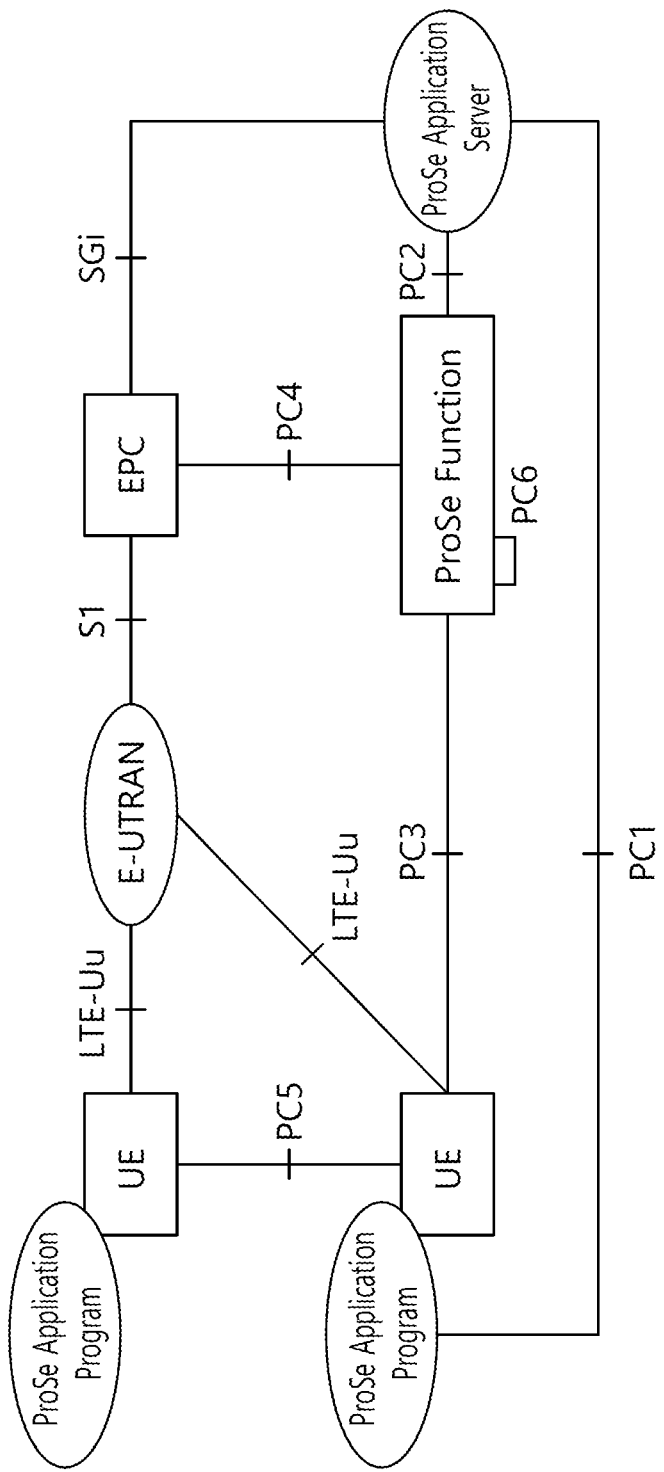
FIG. 4 shows a basic structure for ProSe.

FIG. 4 shows a basic structure for ProSe.

Referring to FIG. 4, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.
  Interworking via a reference point toward the 3rd party applications
  Authorization and configuration of UE for discovery and direct communication
  Enable the functionality of EPC level ProSe discovery
  ProSe related new subscriber data and handling of data storage, and also handling of the ProSe identities
  Security related functionality
  Provide control towards the EPC for policy related functionality
  Provide functionality for charging (via or outside of the EPC, e.g., offline charging)

A reference point and a reference interface in the basic structure for ProSe are described below.
  PC1: a reference point between the ProSe application program within the UE and the ProSe application program within the ProSe APP server. This is used to define signaling requirements in an application dimension.
  PC2: a reference point between the ProSe APP server and the ProSe function. This is used to define an interaction between the ProSe APP server and the ProSe function. The update of application data in the ProSe database of the ProSe function may be an example of the interaction.
  PC3: a reference point between the UE and the ProSe function. This is used to define an interaction between the UE and the ProSe function. A configuration for ProSe discovery and communication may be an example of the interaction.
  PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.
  PC5: a reference point used for using control/user plane for discovery and communication, relay, and 1:1 communication between types of UE.
  PC6: a reference point for using a function, such as ProSe discovery, between users belonging to different PLMNs.
  SGi: this may be used to exchange application data and types of application dimension control information.

The D2D operation may be supported both when UE is serviced within the coverage of a network (cell) or when it is out of coverage of the network.

Figure 5:
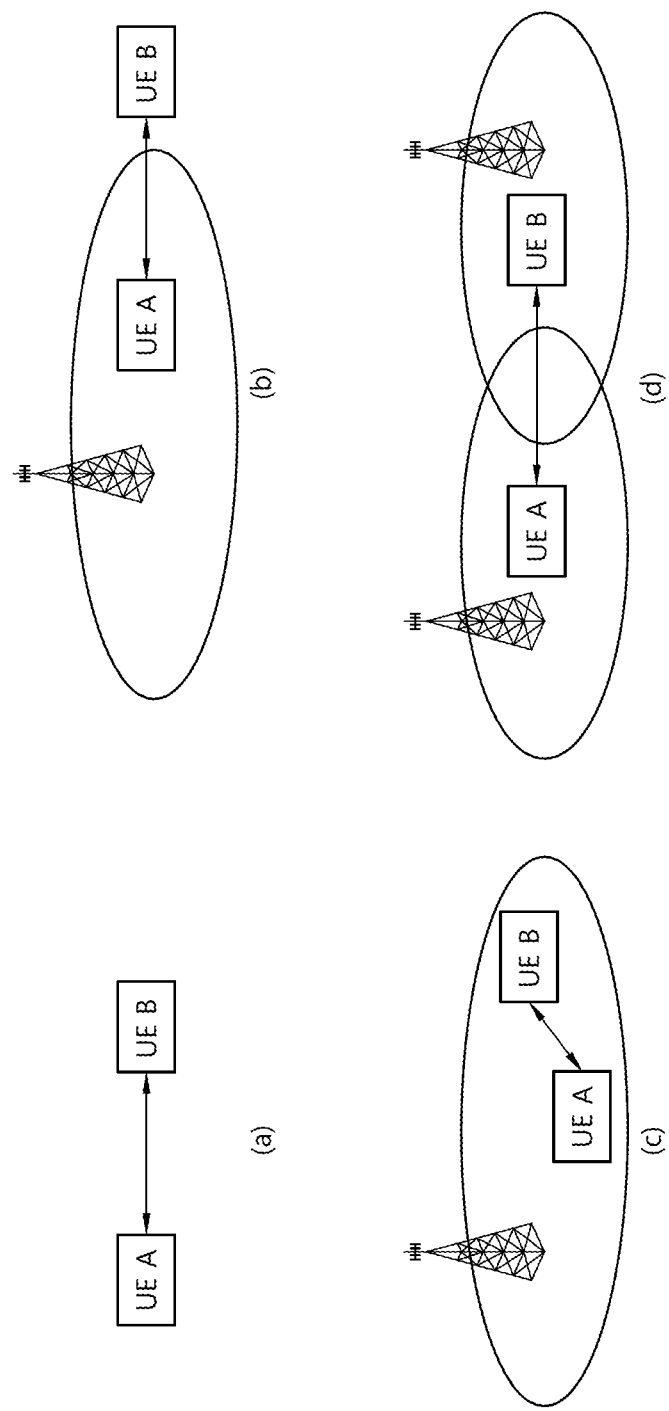
FIG. 5 shows the deployment examples of types of UE performing ProSe direct communication and cell coverage.

FIG. 5 shows the deployment examples of types of UE performing ProSe direct communication and cell coverage.

Referring to FIG. 5(a), types of UE A and B may be placed outside cell coverage. Referring to FIG. 5(b), UE A may be placed within cell coverage, and UE B may be placed outside cell coverage. Referring to FIG. 5(c), types of UE A and B may be placed within single cell coverage. Referring to FIG. 5(d), UE A may be placed within coverage of a first cell, and UE B may be placed within coverage of a second cell.

ProSe direct communication may be performed between types of UE placed at various positions as in FIG. 5.

<Radio Resource Allocation for D2D Communication (ProSe Direct Communication)>.

At least one of the following two modes may be used for resource allocation for D2D communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<D2D Discovery (ProSe Direct Discovery)>

D2D discovery refers to the procedure used in a ProSe capable terminal discovering other ProSe capable terminals in close proximity thereto and may be referred to as ProSe direct discovery. The information used for ProSe direct discovery is hereinafter referred to as discovery information.

A PC 5 interface may be used for D2D discovery. The PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement. The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be broadcasted through the SIB. The configuration may be provided through a UE-specific RRC message. Or the configuration may be broadcasted through other than the RRC message in other layer or may be provided by UE-specific signaling.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Now, the present invention is described.

The present invention is related to a V2X (vehicle-to-everything) communication. In the V2X communication, the above-described D2D operation can be applied in terms of communication between terminals and terminals.

First, in V2X, 'X' may mean a pedestrian. In this case, V2X may be represented as V2P, and may mean communication between a vehicle (or a device installed in the device) and a device carried by the pedestrian. Herein, the pedestrian is not necessarily limited to a person walking on the road, and may include a person riding a bicycle and a driver or passenger of a vehicle (below a specific speed).

Alternatively, in V2X, 'X' may mean a vehicle. In this case, V2X may be represented as V2V, and may mean communication between vehicles. Alternatively, 'X' may be an infrastructure/network. In this case, V2X may be represented as V2I or V2N, and may mean communication between a vehicle and a roadside unit (RSU) or between the vehicle and the network. The RSU may be a transportation infrastructure, for example, a device for speed notifications. The RSU may be implemented in a base station (BS) or a fixed UE or the like.

Hereinafter, for convenience of explanation, a V2P communication-related device carried by a pedestrian (or a person) is referred to as a 'P-UE', and a V2X communication-related device installed in a vehicle is referred to as a 'V-UE'. In the present invention, the term 'entity' may be interpreted as at least one of a P-UE, a V-UE, an RSU, a network, and an infrastructure.

[Proposed Method #1]

A V2X UE may discover or detect multiple resource collisions. Herein, the resource collision may mean a case where different UEs simultaneously transmit signals by using the same resource.

For example, in a state where the V2X UE periodically transmits a signal related to V2X communication, a different UE may also transmit a signal by using the same resource at multiple time points among transmission time points of the signal. In this case, multiple resource collisions may occur. A method of discovering/detecting the resource collision will be described later.

When the V2X UE discovers or detects multiple resource collisions (hereinafter, simply referred to a collision), collision-related information may be reported to an adjacent different UE (and/or a serving BS) related to a corresponding resource collision through a predefined channel (and/or signaling). The collision-related information may include, for example, at least one of 'information indicating whether a collision occurs', 'location information of a resource in which a collision occurs', and 'information of a UE in which a collision occurs'.

A "hidden node problem" may be effectively solved through the collision-related information. The hidden node problem means a problem in which a collision detection/avoidance operation cannot be performed between nodes of which V2X communication coverages do not overlap with each other.

Figure 6:
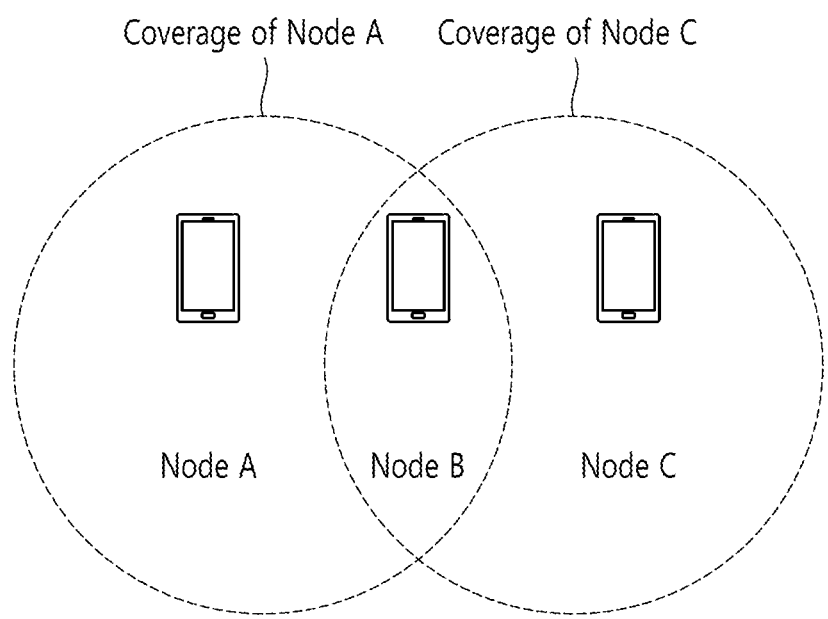
FIG. 6 exemplifies a hidden node problem.

FIG. 6 exemplifies a hidden node problem.

Referring to FIG. 6, nodes A and B are communicating, and nodes B and C are communicating. In this case, a communication coverage of the node A includes the node B, but may not include the node C. Likewise, a communication coverage of the node C includes the node B, but may not include the node A. In this case, the node C is a hidden node to the node A, the node A is a hidden node to the node C. A collision occurs when a signal transmitted by the node A to the node B and a signal transmitted by the node C to the node B are transmitted through the same time/frequency resource. In this case, when the node B reports collision-related information to the nodes A and C (or a serving BS of the nodes A and C), the nodes A and C may attempt to avoid the collision by using the collision-related information.

However, the present invention is not limited to a situation in which the hidden node problem exists when UEs are disposed. For example, the present invention is also applicable to a case where the node A and the node B exist within mutual communication coverages of in FIG. 6.

Figure 7:
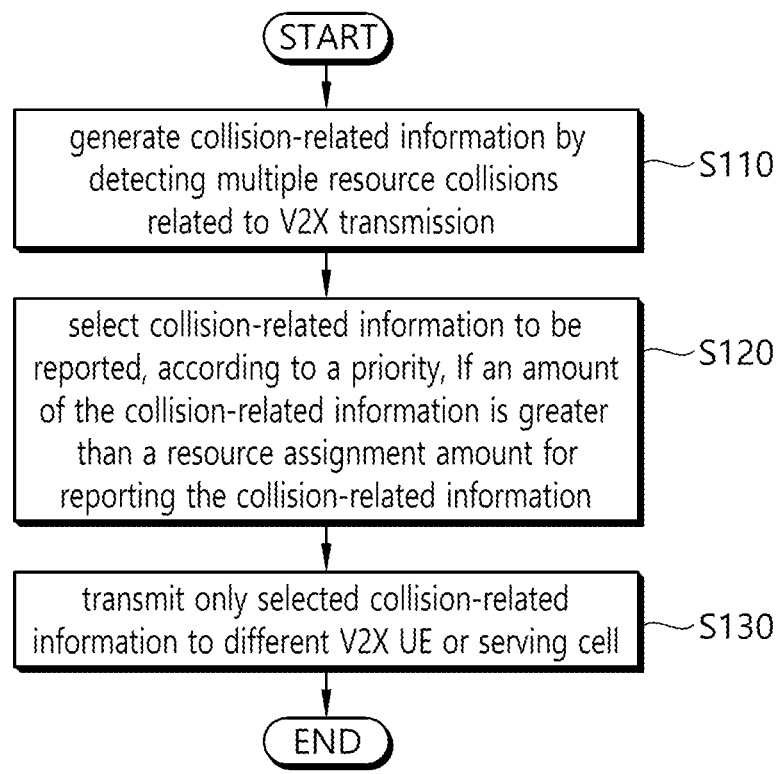
FIG. 7 exemplifies a method of operating a UE when a resource collision occurs in V2X communication.

FIG. 7 exemplifies a method of operating a UE when a resource collision occurs in V2X communication.

Referring to FIG. 7, a V2X UE may generate collision-related information by detecting multiple resource collisions related to V2X transmission (S110).

If an amount of the collision-related information is greater than a resource assignment amount for reporting the collision-related information, the V2X UE selects the collision-related information to be reported according to a priority (S120).

The V2X UE transmits only the selected collision-related information to a different V2X UE or a serving cell (S130).

Now, each step of FIG. 7 will be described in detail.

First, a resource collision detection/avoidance operation may be performed through an operation of detecting/decoding a predefined or signaled channel (e.g., a channel for carrying a control signal such as a scheduling assignment (SA)). That is, a UE may detect/decode scheduling information for a different UE to recognize a resource to be used by the different UE, and may determine whether a collision occurs on the basis of whether the resource collides with a resource to be used by the UE itself. For example, a first V2X UE may receive/decode an SA for a second V2X UE which is a different V2X UE, and thus may know a resource in which the second V2X UE transmits a signal. The SA for the second V2X UE may be received from the second V2X UE or may be received from a serving BS.

Additionally/alternatively, the resource collision detection/avoidance operation may be performed through an energy detection operation of a predefined or signaled channel (e.g., an SA and/or data-related channel). For example, the collision detection/avoidance operation may be performed in a channel/resource region in which energy greater than a predefined or signaled threshold is detected, under the assumption that it is occupied/used by the different V2X UE.

On the other hand, there may be a case where all of the multiple resource collisions cannot be reported even if the V2X UE discovers (/detects) the multiple resource collisions on the basis of at least one of the aforementioned methods, that is, 1) detection/decoding of a channel or signal for a different UE, and 2) energy detection. For example, an amount of collision-related information to be delivered may be greater than a specified channel bit or a resource assigned for the purpose/usage for reporting a situation related to a resource collision to a different UE or a serving BS (for example, when the number of collisions is great). In this case, a rule may be defined such that the V2X UE preferentially informs or reports a specific collision selected by considering the following parameter/condition. That is, a priority of the collision-related information may be determined for each collision on the basis of at least one of the following exemplary conditions, and the collision-related information to be reported may be selected according to the priority.

Example #1

Among the multiple resource collisions, which resource collision will be preferentially reported may be determined on the basis of a detected or received power level. For example, a collision received (/detected) at a relatively high power level greater than a predefined or signaled threshold may be preferentially reported (or a collision received/detected at a relatively low power level greater than the predefined or signaled threshold may be preferentially reported). The collision received/detected at the relatively high power level is highly likely to be caused by a different V2X UE located at a relatively short distance from a V2X UE itself, and thus a higher priority may be given in the reporting.

The power level may be predefined or may be obtained through an operation of measuring a specific signal (e.g., at least one of an SA, data, a synchronization signal, a reference signal (e.g., DM-RS)) of a predefined or signaled specific channel.

Example #2

Which resource collision will be preferentially reported may be determined based on a collision occurrence count (and/or a collision duration).

For example, a rule may be defined to preferentially report a collision having a relatively great (or small) occurrence count (and/or a long (or short) duration).

Example #3

Which resource collision will be preferentially reported may be determined based on a type or kind of a channel or signal. For example, a rule may be defined to preferentially report a collision of a resource for transmitting a predefined or signaled channel (/signal) having a high protection priority (e.g., a control channel such as an SA or a channel for carrying a control signal).

Example #4

Which resource collision will be preferentially reported may be determined based on a period of an associated or related resource pool and/or an interval between durations (/time points) in which retransmission is possible.

For example, a rule may be defined to preferentially report a collision related to a resource pool assigned with a relatively long (or short) period (and/or a collision in a resource assigned to enable retransmission after a relatively long (or short) time).

[Proposed Method #2]

It may be defined that a V2X UE performs '(data transmission) resource reservation' for predefined or signaled multiple 'message generation periods' or 'SA periods' on the basis of a specific number (e.g., 1) or relatively small number of SA transmissions. For example, the V2X UE may reserve multiple V2X transmission resources across multiple subframes, and may report the multiple V2X transmission resources to a different V2X UE by transmitting an SA one time. The different V2X UE may know V2X resources reserved by the V2X UE by receiving/decoding the SA from the V2X UE.

The aforementioned rule may be applied so that the '(data transmission) resource reservation' is performed on multiple 'message generation periods' or 'SA periods' with a relatively small 'SA transmission overhead'.

However, in case of applying this rule, when different V2X transmission UEs perform the '(data transmission) resource reservation' for resources for the same location, a (data transmission) resource collision may occur between the V2X transmission UEs for a relatively long time.

Figure 8:
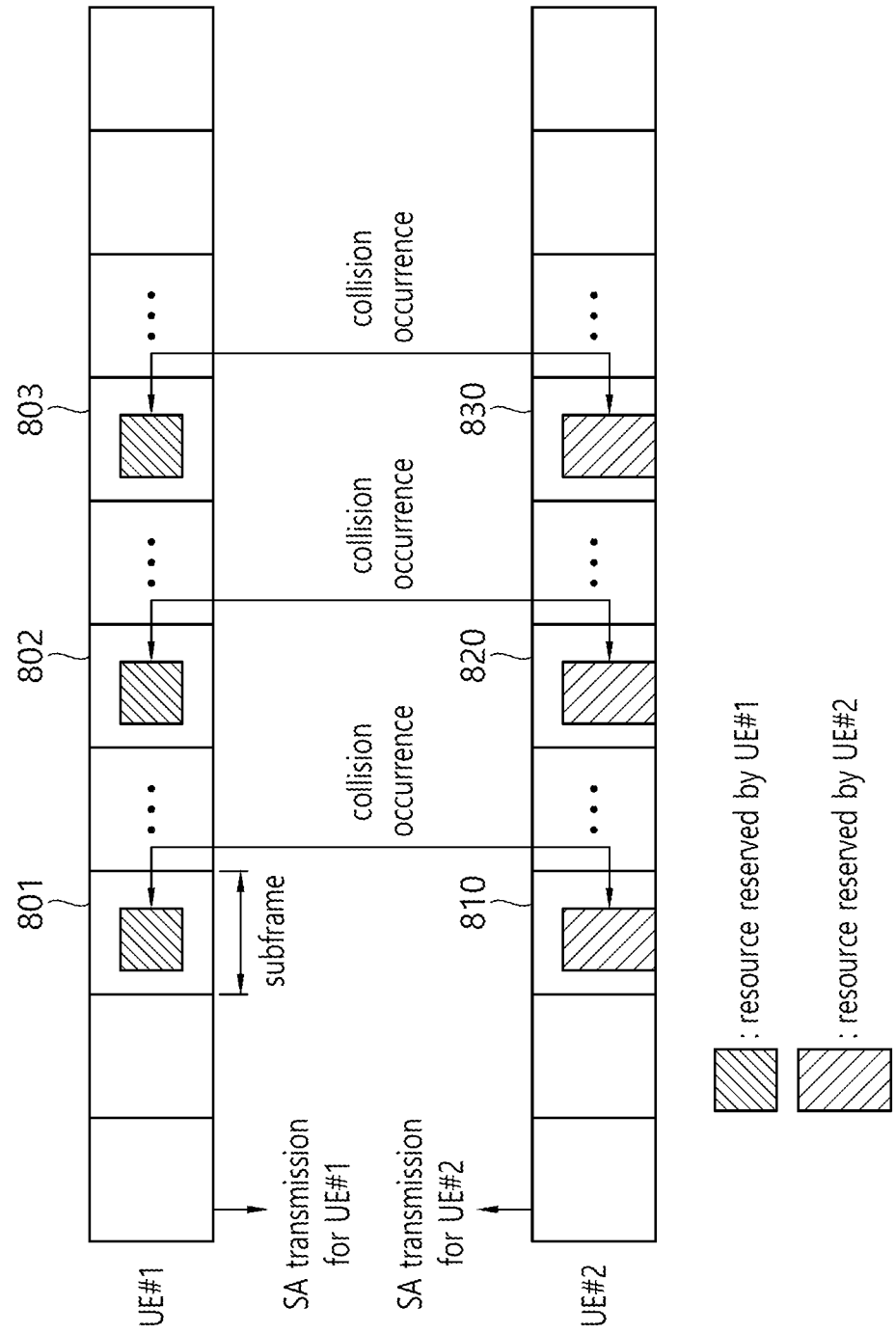
FIG. 8 shows an example in which multiple resource collisions occur.

FIG. 8 shows an example in which multiple resource collisions occur.

Referring to FIG. 8, UEs#1 and #2 are V2X UEs. The UE#1 transmits an SA for the UE#1. The SA may report resources reserved by the UE#1, that is, resources reserved in multiple periodic subframes such as subframes 801, 802, and 803.

The UE#2 may report the resources reserved in the multiple periodic subframes such as the subframe 810, 820, and 830 to the UE#1 through the SA.

A resource collision occurs when resources reserved respectively by the UEs#1 and #2 partially or entirely overlap in a time/frequency region. A case where the resource collision occurs three times repeatedly is exemplified in FIG. 8.

In one method for mitigating/solving this problem, predefined or signaled 'half duplex hopping' is applied.

For example, it is assumed that a resource selection related to data transmission is performed based on a subchannel unit having a predefined or signaled (time/frequency) size. As a result of applying the 'half duplex hopping (e.g., SA hopping)', if multiple (or at least a predefined or signaled threshold number (e.g., 2)) subchannels must be used (for the purpose of transmission) on one subframe, the V2X UE may be allowed to perform '(data transmission) resource reservation reselection' (and/or '(data transmission) resource reselection').

Figure 9:
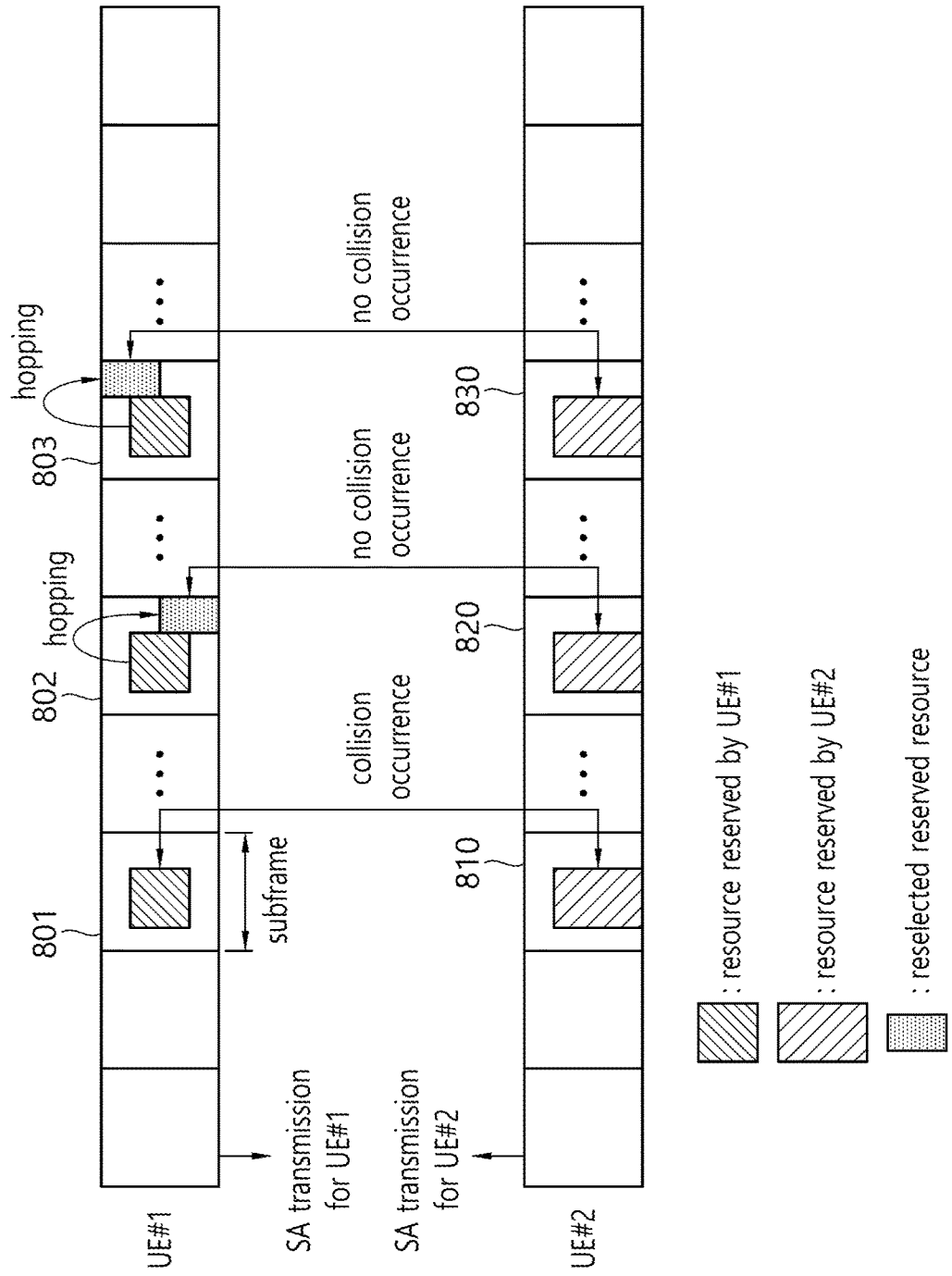
FIG. 9 exemplifies a method of operating a UE when multiple collisions are expected.

FIG. 9 exemplifies a method of operating a UE when multiple collisions are expected.

Referring to FIG. 9, in the same situation as FIG. 8, a UE#1 may reselect a different V2X transmission resource through hopping in subframes 802 and 803 in which a resource collision is expected (In FIG. 9, it is indicated as a 'reselected reservation resource', and may be a resource of a sub-channel unit). Since the reselected V2X transmission resource does not overlap with a resource reserved by a UE#2, a resource collision does not occur.

That is, when a resource collision occurs repeatedly or is expected to occur multiple times corresponding to at least a specific count or for at least a specific time between the UEs #1 and #2, a certain UE (e.g., the UE#1) may reselect a reserved resource to prevent a collision with a different UE.

By applying such a rule, 'transmission based on multiple sub-channels' is performed on one subframe, thereby mitigating a problem in that a different V2X UE performing a V2X transmission operation at a corresponding subframe time point entirely loses or cannot receive 'transmission based on multiple sub-channels'.

Figure 10:
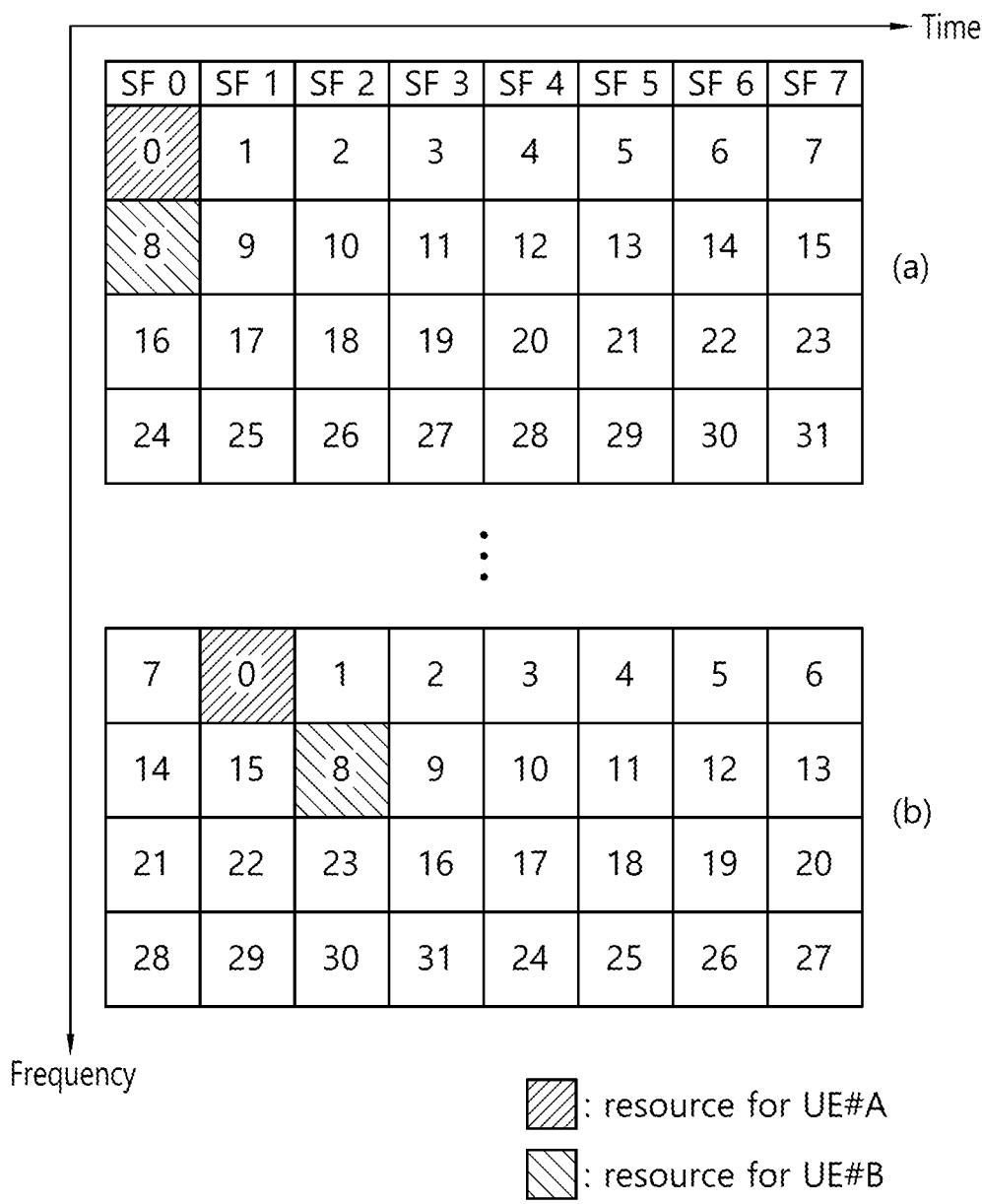
FIG. 10 shows an example of applying half duplex hopping.

FIG. 10 shows an example of applying half duplex hopping.

In D2D transmission, a scheduling assignment (SA) may be transmitted two times.

Referring to FIG. 10A, a resource indicated by a resource candidate index #0 is selected as a first SA transmission resource for a UE#A, and a resource indicated by a candidate index #8 may be selected as a first SA transmission resource for a UE#B. The resource indicated by the resource candidate index #0 and the resource indicated by the resource candidate index #8 are located in the same subframe, i.e., SF0. In this case, if the UEs#A and #B are UEs operating with half duplex, during its SA is transmitted, an SA transmitted by a different UE cannot be received. This may be a half duplex problem.

Accordingly, the UEs#A and #B may select different resources in a time domain so that SA transmission time points do not overlap with each other in a second SA transmission. This may be referred to as half duplexing hopping. For example, as shown in FIG. 10B, the UE#A may select a resource indicated by a resource candidate index #0 in a subframe 1 (SF1), and the UE#B may select a resource indicated by a resource candidate index #8 in a subframe 2 (SF2). When the half duplex hopping is applied, second SA transmissions of the UE#A and the UE#B are performed on different subframes, thereby solving the aforementioned half duplex problem. The half duplex hopping related to the SA transmission may be expressed as follows.

When a first transmission is given as $n_{t1}=\text{mod}(s, N_t)$ and $n_{f1}=\text{floor}(s/N_t)$, a second transmission may be given as $n_{t2}=\text{mod}(s+\text{mod}(\text{floor}(s/N_t), N_s)+1, N_t)$ and $n_{f2}=\text{floor}(N_f/2)+n_{f1}$. Herein, $N_s=N_t-1$.

Parameters in the above equation have the following meanings.

$N_t$: A size of a D2D resource pool in a time axis (expressed by the number of subframes)

$N_f$: A size of a D2D resource pool in a frequency axis (expressed by the number of resource blocks (RBs))

s: An SA transmission resource candidate index on a D2D resource pool $n_{t1}$: A subframe index of a candidate resource selected for a first SA transmission in a D2D resource pool $n_{f1}$: An RB index of a candidate resource selected for a first SA transmission in a D2D resource pool $n_{t2}$: A subframe index of a candidate resource selected for a second SA transmission in a D2D resource pool $n_{f2}$: An RB index of a candidate resource selected for a second SA transmission in a D2D resource pool FIG. 11 shows a V2X signal transmission method of a UE.

Figure 11:
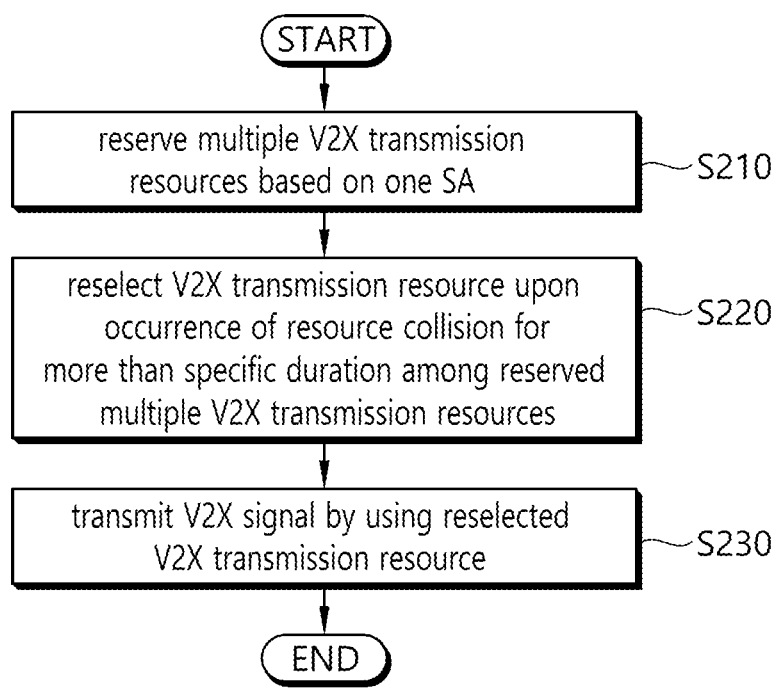
FIG. 11 shows a V2X signal transmission method of a UE.

Referring to FIG. 11, the UE reserves multiple V2X transmission resources on the basis of one scheduling assignment (SA) (S210). The SA may be transmitted to a different UE to play a role of reporting reserved V2X transmission resources of the UE. The multiple V2X transmission resources may be reserved in multiple subframes.

When a resource collision occurs at least a specific time among the multiple reserved V2X transmission resources, the UE reselects a V2X transmission resource (S220). Alternatively, the UE may reselect a V2X transmission resource when an amount of V2X information to be transmitted is greater than or equal to a specific value. The UE may select the V2X transmission resource by comparing a predetermined value and the amount of the V2X information to be transmitted.

Whether the resource collision occurs may be determined based on at least one of: 1) whether V2X transmission resources indicated by an SA received from a different UE overlap with the reserved multiple V2X transmission resources; and 2) whether energy greater than or equal to a specific value is detected from the reserved multiple V2X transmission resources. The V2X transmission resource may be reselected in subframes which come after the specific time among the multiple subframes.

The V2X signal is transmitted by using the reselected V2X transmission resource (S230).

Meanwhile, when '(data transmission) resource reservation' is no longer valid for a corresponding resource upon elapse of multiple 'message generation periods' or 'SA periods' in which the V2X UE performs '(data transmission) resource reservation', a different V2X UE may perform SA transmission to perform the '(data transmission) resource reservation'.

When energy is not detected for a corresponding SA resource at a time after the 'message generation period' or the 'SA period' (or when it is detected to be below a specific level, wherein a value for an energy level may be predefined or signaled), it may be regarded that there is no SA transmission in the SA resource (that is, the SA is not detected).

Alternatively, even if a failure of SA demodulation occurs in the SA resource, it may also be regarded that there is no SA transmission in the SA resource (that is, the SA is not detected).

Figure 12:
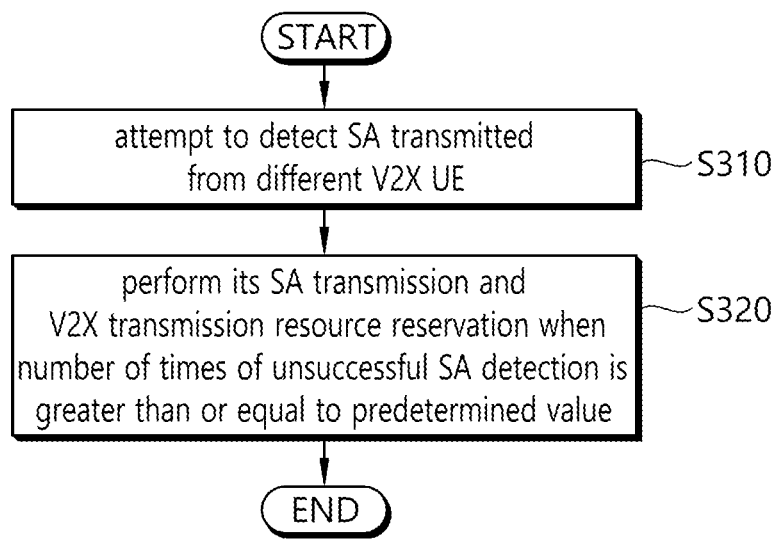
FIG. 12 exemplifies a UE operation for reserving a V2X transmission resource.

FIG. 12 exemplifies a UE operation for reserving a V2X transmission resource.

Referring to FIG. 12, a UE attempts to detect a scheduling assignment (SA) transmitted from a different V2X UE (S310).

If the number of times of unsuccessful SA detection is greater than or equal to a predetermined value, the UE transmits its SA and performs V2X transmission resource reservation (S320).

That is, in order to avoid a collision of the SA and related data resource, SA transmission and '(data transmission) resource reservation' may be performed when the number of times of unsuccessful SA detection is greater than or equal to a specific count.

A value for the number of times of unsuccessful SA detection may be predefined or signaled.

If the number of times of SA transmission of the UE is defined as a plural number, some SA transmissions may be transmitted in advance before reserved data transmission is completely finished, and thus may be used in the meaning of pre-reservation and pre-collision avoidance for '(data transmission) resource reservation' in a next duration. For example, if V2X transmission resources are reserved for multiple subframes, an SA is transmitted to reserve next V2X transmission resources in at least one subframe among the multiple subframes.

Since the '(data transmission) resource reservation' has a purpose of decreasing an 'SA transmission overhead', it may be meaningless to perform SA transmission for pre-reservation in all 'message generation periods'. Therefore, it may be limited such that SA transmission for pre-reservation is performed only in a part of duration before reserved data transmission is completely finished (e.g., last one 'message generation period'). In this case, if there are many V2X UEs performing pre-reservation for a corresponding data resource, a different V2X UE may report information on a resource collision by detecting SA transmission for pre-reservation.

In this case, the V2X UE performing SA detection may report whether a specific SA resource collides or may selectively report information on a V2X UE using the SA resource.

That is, when the V2X UE detecting the SA intends to perform V2X communication with a nearby V2X UE, a V2X UE in which an SA with a low energy level is detected may be considered as a cause of a resource collision and may report information on the V2X UE. Alternatively, on the contrary, only information on a V2X UE in which an SA with a high energy level is detected may be selectively reported.

Accordingly, only a V2X UE which is not likely to collide (or a selected V2X UE) may perform a '(data transmission) resource reservation' operation.

[Proposed Method #3]

A V2X communication-related synchronization signal may be transmitted only on a predefined specific carrier (e.g., a primary carrier). Alternatively, a V2X UE may assume that the V2X communication-related synchronization signal is transmitted only on the predefined specific carrier. When such a rule is applied, a (time/frequency) synchronization is acquired from a specific reference in a corresponding specific carrier (e.g., a primary carrier), and all channels (/signals) (on different carriers including a corresponding specific carrier) synchronized based on the reference may be received by using the acquired synchronization When such a rule is applied, it may be interpreted that the V2X UE performs asynchronous-based V2X (message) reception by separating it on a time resource region.

Figure 13:
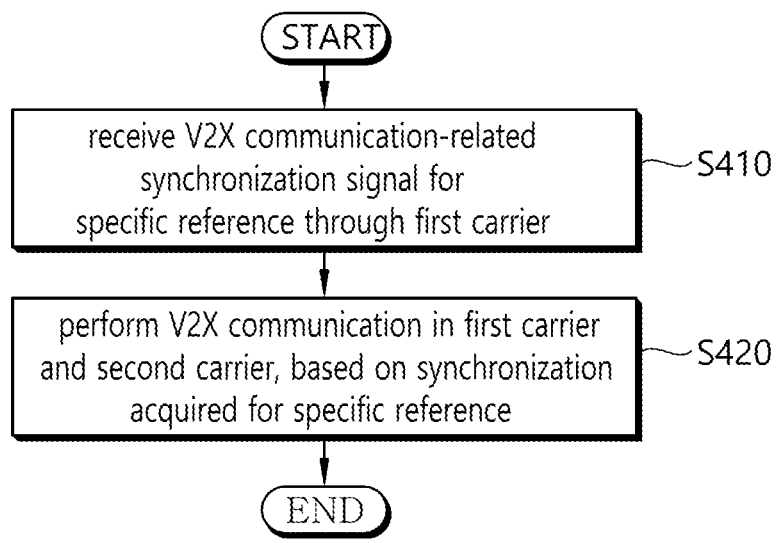
FIG. 13 exemplifies a UE operation according to the proposed method #3.

FIG. 13 exemplifies a UE operation according to the proposed method #3.

Referring to FIG. 13, a UE may receive a V2X communication-related synchronization signal for a specific reference through a first carrier (S410), and may perform V2X communication of a first carrier and a second carrier on the basis of a synchronization acquired for the specific reference (S420). The specific reference may be, for example, a cell in the first carrier. The first carrier may be a primary carrier or a serving carrier, and the second carrier may be a secondary carrier or a carrier of a non-serving band.

Examples for the aforementioned proposed method can be included as one of implementation methods of the present invention, and thus can be apparently regarded as a sort of proposed methods. In addition, although the aforementioned proposed methods can be independently implemented, it is also possible to be implemented by combining (or merging) some proposed methods. Although the proposed method is described on the basis of a 3GPP LTE/LTE-A system for convenience of explanation, a system to which the proposed method is applied can also be extended to another system other than the 3GPP LTE system. For example, the proposed methods of the present invention can also be extendedly applied for D2D communication. The D2D communication implies that a UE communicates with a different UE directly by using a radio channel. Although the UE implies a UE of a user, when a network device such as a BS transmits/receives a signal according to a communication scheme between UEs, it may also be regarded as a sort of the UE.

Figure 14:
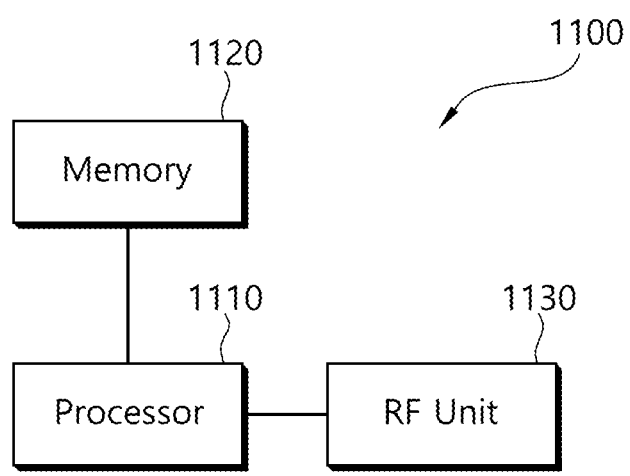
FIG. 14 is a block diagram of a UE according to an embodiment of the present invention.

FIG. 14 is a block diagram of a UE according to an embodiment of the present invention.

Referring to FIG. 14, a UE 110 includes a processor 1110, a memory 1120, and a radio frequency (RF) unit 1130. The processor 1110 implements the proposed function, procedure, and/or method.

The RF unit 1130 is connected to the processor 1110 to transmit and receive radio signals.

The processor may comprise an application-specific integrated circuit (ASIC), other chipset, logic circuitry and/or data processing device. The memory may include read-only memory (ROM), random access memory (RAM), flash memory, memory cards, storage media, and/or other storage devices. The RF unit may include a baseband circuit for processing the radio signal. When the embodiment is implemented in software, the above-described techniques may be implemented with modules (processes, functions, and so on) that perform the functions described above. The module may be stored in the memory and may be executed by the processor. The memory may be internal or external to the processor, and may be coupled to the processor by various well known means.

What is claimed is:

1. A method for transmitting a vehicle-to-everything (V2X) signal of a terminal in a wireless communication system, the method comprising:
   attempting to detect a scheduling assignment (SA) transmitted from a different V2X terminal;
   reserving multiple V2X transmission resources when a number of times of unsuccessful SA detection is greater than or equal to a predetermined value;

reselecting a V2X transmission resource when a resource collision occurs for at least a specific time among the multiple reserved V2X transmission resources; and transmitting a V2X signal by using the reselected V2X transmission resource.

2. The method of claim 1, wherein whether the resource collision occurs is determined based on whether V2X transmission resources indicated by the scheduling assignment received from the different V2X terminal overlap with the reserved multiple V2X transmission resources.

3. The method of claim 1, wherein whether the resource collision occurs is determined based on whether energy greater than or equal to a specific value is detected from the reserved multiple V2X transmission resources.

4. The method of claim 1, wherein the multiple V2X transmission resources are reserved in multiple subframes.

5. The method of claim 4, wherein a V2X transmission resource is reselected in subframes which come after the specific time among the multiple subframes.

6. The method of claim 4, wherein a scheduling assignment for reserving next V2X transmission resources is transmitted in at least one subframe among the multiple subframes.

7. The method of claim 1, wherein, upon detecting multiple resource collisions from the reserved multiple V2X transmission resources, only information regarding some resource collisions determined based on a priority is reported to a different terminal or a base station.

8. The method of claim 7, wherein the priority is determined based on at least one of a reception power level of a resource in which a resource collision occurs, the number of times of resource collision occurrences, a duration of the resource collision, a type of a channel or signal transmitted in the resource in which the resource collision occurs, and an assignment period of the resource in which the resource collision occurs.

9. A terminal capable of transmitting a vehicle-to-everything (V2X) signal, the terminal comprising:
   a radio frequency (RF) unit to transmit and receive a radio signal; and
   a processor operatively coupled to the RF unit, wherein the processor is configured to:
   attempt to detect a scheduling assignment (SA) transmitted from a different V2X terminal;
   reserve multiple V2X transmission resources when a number of times of unsuccessful SA detection is greater than or equal to a predetermined value;
   reselect a V2X transmission resource when a resource collision occurs for at least a specific time among the multiple reserved V2X transmission resources; and
   transmit a V2X signal by using the reselected V2X transmission resource.

* * * * *